United States Patent
Kuo

(10) Patent No.: US 7,305,682 B2
(45) Date of Patent: Dec. 4, 2007

(54) SENSOR MECHANISM FOR DETECTING TRAY IN/OUT MOTION

(75) Inventor: Tsung Jung Kuo, Hsinchu (TW)

(73) Assignee: Lite-On It Corporation (TW)

( * ) Notice: Subject to any disclaimer, the term of this patent is extended or adjusted under 35 U.S.C. 154(b) by 422 days.

(21) Appl. No.: 10/992,846

(22) Filed: Nov. 22, 2004

(65) Prior Publication Data

US 2006/0053432 A1    Mar. 9, 2006

(30) Foreign Application Priority Data

Sep. 3, 2004    (TW) .............................. 93126790 A

(51) Int. Cl.
*G11B 17/22*    (2006.01)
*G11B 17/04*    (2006.01)

(52) U.S. Cl. .................................... 720/606; 369/30.32

(58) Field of Classification Search ............ 369/30.32, 369/30.53, 30.78, 30.83; 720/606, 612, 614
See application file for complete search history.

(56) References Cited

U.S. PATENT DOCUMENTS 4,788,673 A * 11/1988 Ikedo et al. ............. 369/30.83
2004/0240331 A1* 12/2004 Sakano et al. ........... 369/30.69

FOREIGN PATENT DOCUMENTS

JP         03214458 A  *  9/1991
JP      2002150650 A  *  5/2002
JP      2003323753 A  * 11/2003

* cited by examiner

*Primary Examiner*—William J Klimowicz
(74) *Attorney, Agent, or Firm*—Bacon & Thomas, PLLC

(57) ABSTRACT

The present invention relates to a sensor mechanism of an optical disc device for detecting tray in/out motion, which comprises a swing bar having a actuating bar, a spinning center and a protrusion portion; a gear for driving the protrusion portion to rotate the swing bar against the spinning center; at least one sensor for emitting a signal that the tray has been already moved in/out when it is touched by the actuating bar, so that the device prepares to perform next function.

16 Claims, 7 Drawing Sheets

SENSOR MECHANISM FOR DETECTING TRAY IN/OUT MOTION

This Non-provisional application claims priority under 35 U.S.C. §119(a) on Patent Application No(s). 093126790 filed in Taiwan, Republic of China on Sep. 3, 2004, the entire contents of which are thereby incorporated by reference.

FIELD OF THE INVENTION

The present invention relates to a sensor mechanism of an optical disc device for detecting tray in/out motion, particularly to a sensor mechanism of an optical disc device of multi-disc type for detecting tray in/out motion which is a simple structure and is easily assembled.

BACKGROUND OF THE INVENTION

There are two kinds of tray for carrying disc in optical disc devices, including single-disc type and multi-disc type. The multi-disc type optical disc device usually uses a magazine having plural trays carrying discs so that the optical disc device can read a selected disc based on the user's instruction without manually changing the discs. When the optical disc device receives an instruction to select a disc, an ejection arm moves to a position to allow an ejection hook pulling the selected tray from the magazine to a predetermined position, then a disc clamper clamps the disc on the selected tray, and an optical pick-up unit plays and reads the disc. After the playing or reading is completed, the disc clamper releases the disc to the tray. Then the ejection hook pushes the tray back to the magazine, and the device then executes the next instruction.

When the ejection hook pulls the selected tray from the magazine to a predetermined position, it needs a signal to start the disc clamper to clamps the disc and then the optical pick-up unit can play and read the disc. When the playing or reading is completed and the ejection hook pushes the tray carrying the disc back to the magazine, it also needs a signal to start the ejection arm to move downwards/upwards to execute the next instruction.

However, in conventional optical disc devices, after the ejection hook pulls a tray from a magazine to a position for playing or from the position for playing to the magazine, how to determine that the tray has been moved in a suitable position then emit a signal for instructing the device to execute the next action at an appropriate timing, for example, to execute the disc playing/reading or allow the ejection arm moving downwards/upwards to eject the next tray is intended to be resolved by the present inventors.

In view of the above fact, the present inventors have investigated the mechanism of an optical: disc device for detecting tray in/out motion and completed the present invention.

SUMMARY OF THE INVENTION

The present invention relates to a sensor mechanism of an optical disc device for detecting tray in/out motion, which comprising: a swing bar having an actuating bar, a spinning center and a protrusion portion; a gear for driving the protrusion portions to rotate the swing bar; and at least one sensor for emitting a signal when it is touched by the actuating bar which is rotated against the spinning center, so that the device prepares to perform next function.

According to the sensor mechanism of an optical disc device for detecting tray in/out motion of the present invention, by using a simplified swing bar having an actuating bar, a spinning center and protrusion portions in the mechanism for executing tray motion in/out of the optical disc device, and by using a sensor to emit a signal that the tray in/out motion has been already completed, detecting of the tray in/out motion in an appropriate timing is attainable and a next function could be executed in time without changing the exist design of the optical disc device.

Furthermore, the sensor mechanism of an optical disc device for detecting tray in/out motion of the present invention uses the swing bar as designed in association with a sensor to detect whether the tray in/out motion has been already completed. Also, the swing bar is rotated against the spinning center during the action of the tray ejecting mechanism and it then touches the sensor to emit a signal that the tray in/out motion has been already completed. Due to the simplified structure for the swing bar, it has advantages of easily assembling, assembling time saving, and cost reducing.

According to the sensor mechanism of an optical disc device for detecting tray in/out motion of the present invention, when the gear is driving to actuate the ejection arm, the gear will touch against the protrusion portion of the swing bar to push the swing bar rotating against the spinning center. Then the actuating bar will touch the sensor provided in the optical disc device to allow the sensor emitting a signal that the tray in/out motion has been already completed. Therefore, the optical disc device is ready to execute the next function.

According to the sensor mechanism of an optical disc device for detecting tray in/out motion of the present invention, the swing bar is also provided with an extrusion part which is further connected with a spring. Such a spring provides a rebounding force to draw the swing bar back to an original position, i.e. a position that the swing bar does not touch the sensor, if the swing bar is not rotated along with the gear. It therefore protects the actuating bar from touching the sensor if the gear is no action on the swing bar.

Moreover, according to the sensor mechanism of an optical disc device for detecting tray in/out motion of the present invention, since the gear is provided with an array of protrusion teeth along part of its perimeter, the teeth ends of the gear will push the protrusion portion of the swing bar and then rotate the swing bar against the spinning center when the gear rotates. Thereby the actuating bar is also moved to touch the sensor.

In the present invention, the swing bar is provided with at least one protrusion portion, although it can also be provided with two protrusion portions.

According to the sensor mechanism of the present invention, it is easy assembled due to its simplified structure.

BRIEF DESCRIPTION OF THE DRAWINGS

The present invention is illustrated more detail by reference to the accompanying drawings, wherein.

DETAIL DESCRIPTION OF THE INVENTION

Figure 1:
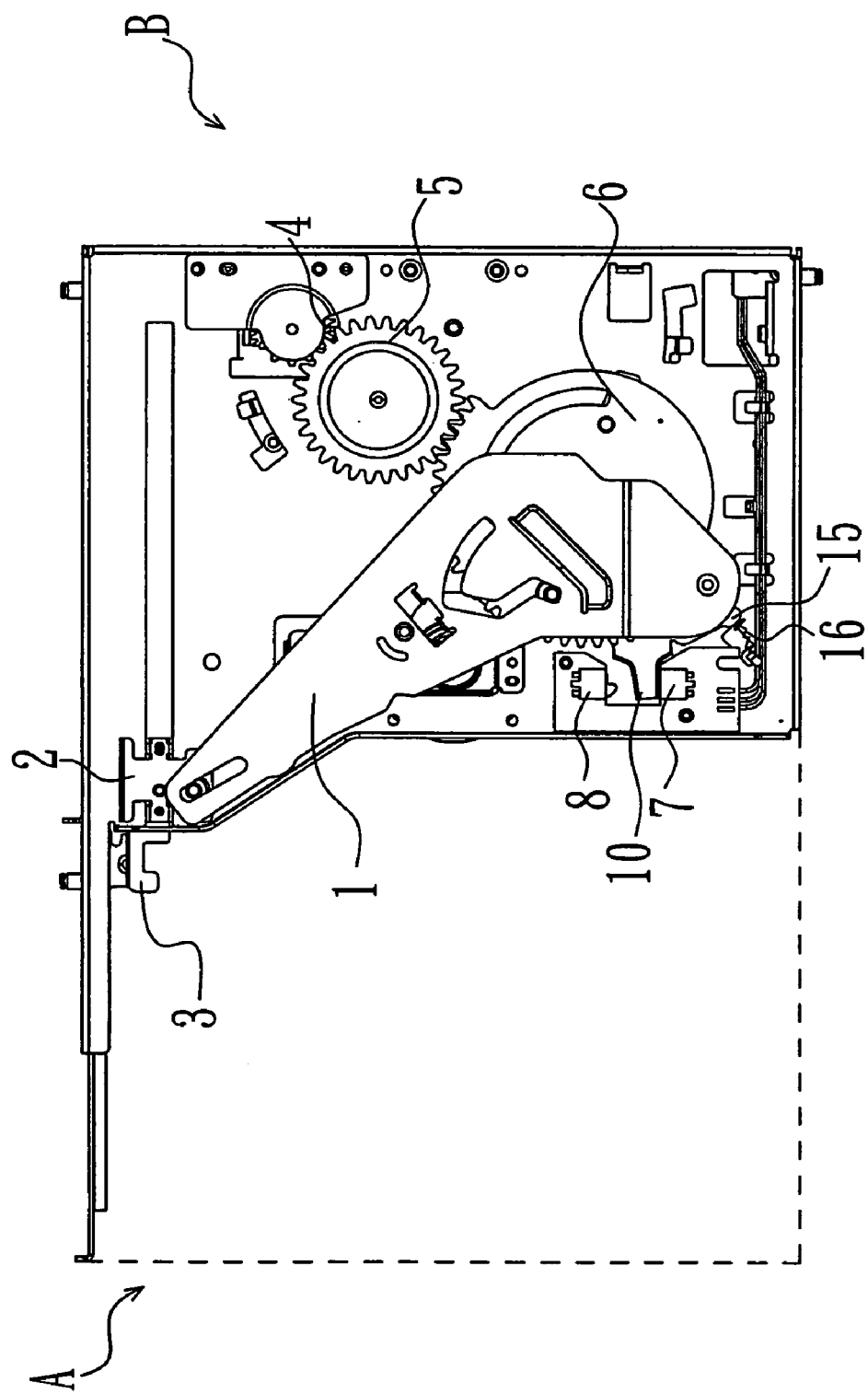
FIG. 1 is a perspective view showing the sensor mechanism of an optical disc device for detecting tray in/out motion of the present invention in a tray-out motion position.

In the drawings, the same element is represented by the same numeral.

FIG. 1 is a perspective view showing the sensor mechanism of an optical disc device for detecting tray in/out motion of the present invention in a tray-out motion position, in which Part A represents a magazine for holding plural trays wherein the discs are set on the trays (not shown in the Figure) and Part B represents a main mechanism for executing tray motion in/out and disc playing/reading. In FIG. 1, the ejection arm 1 is in a position that the tray is moved out which means that the tray is held in the magazine. In this state, the ejection hook 3, which is connected with an ejection arm 1 via a guiding mechanism 2, is held in a position near the magazine for carrying plural trays, and the sensor 7 is touched by an actuating bar 10 to emit a signal that the disc has been already moved out.

Figure 2:
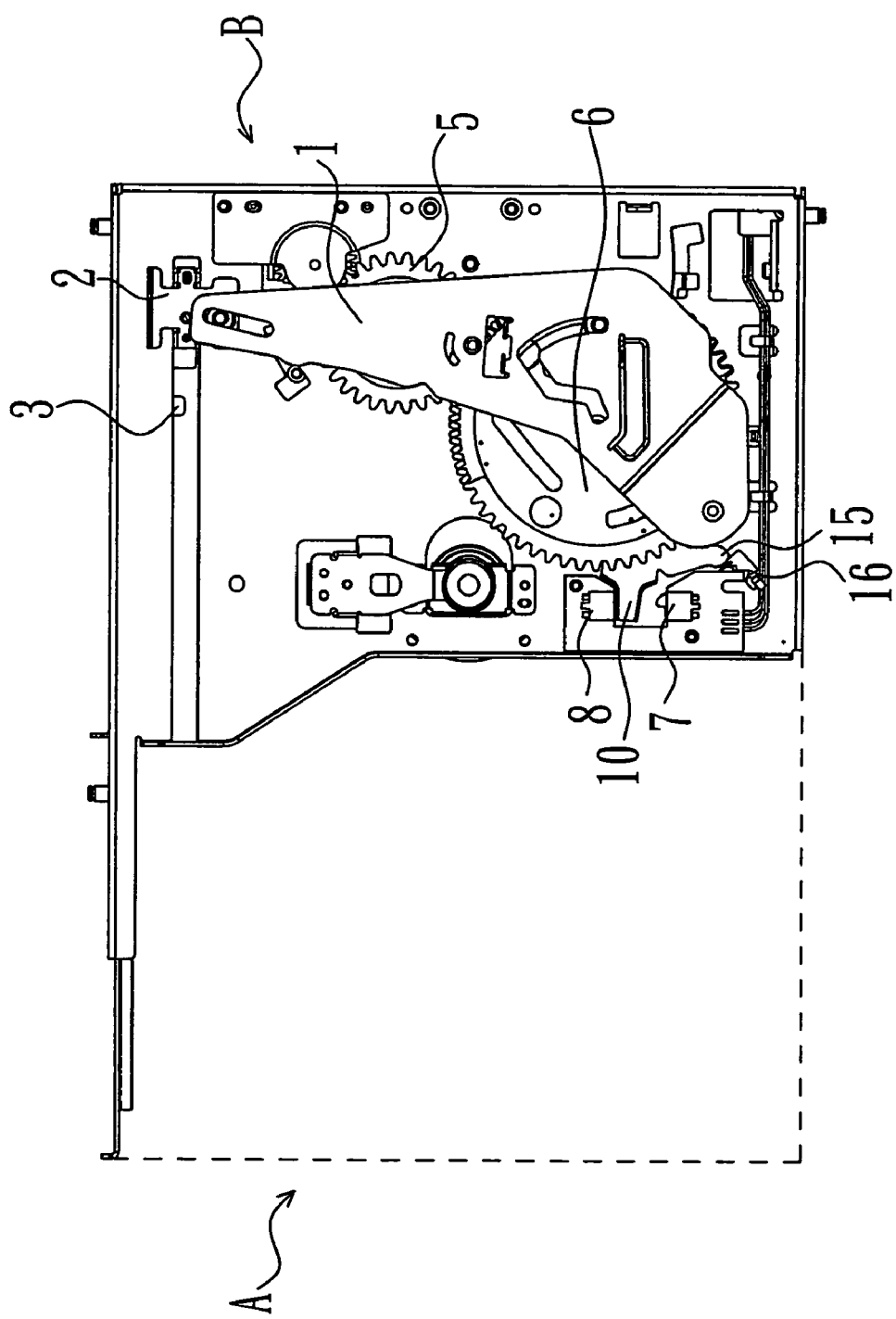
FIG. 2 is a perspective view showing the sensor mechanism of an optical disc device for detecting tray in/out motion of the present invention in a tray-in motion position.

Now referring to FIG. 2, FIG. 2 is a perspective view showing the sensor mechanism of an optical disc device for detecting tray in/out motion of the present invention in a tray-in motion position. When a disc or a tray is to be selected, the optical disc device provides a power to drive the rotation of a drive gear 4 which simultaneous drives the rotation of a middle gear 5 and a gear wheel 6. Thereby the ejection arm 1 is driven to allow the ejection hook 3 pulling the tray in a position for playing/reading the disc on the tray through the guiding mechanism 2. In this time, a sensor 8 is touched by an actuating bar 10 to emit a signal that the disc has been already moved in, which means that the tray is in a position for playing/reading the disc on the tray. Thereafter, the optical disc device is preparing to execute the next function, for example, allowing a disc clamper moving upwards to clamp the disc and play/read the disc.

In this embodiment, there are two sensors, thus whether the ejection arm has pulled the tray to a position for readily playing/reading or pushed the tray back to the magazine is determined respectively by each sensor to emit a signal that the disc is in the position. Thereby the optical disc device is preparing to execute the next function. For example, when the ejection hook 3 of the ejection arm 1 has pulled the tray to a position for disc playing/reading, the sensor 8 is touched by the actuating bar 10 to emit a signal that the disc has been already moved in. Then the optical disc device gives an instruction to allow a disc clamper to clamp the disc and allow the optical pick-up unit to play/read the disc. Also, when the disc playing/reading is completed, the ejection hook 3 of the ejection arm 1 has pushed the tray back to the magazine and the sensor 7 is touched by the actuating bar 10 to emit a signal that the disc has been already moved out. Then the optical disc device gives an instruction to allow the ejection arm moving upwards/downwards to select next tray to play/read the disc on the tray.

Figure 3:
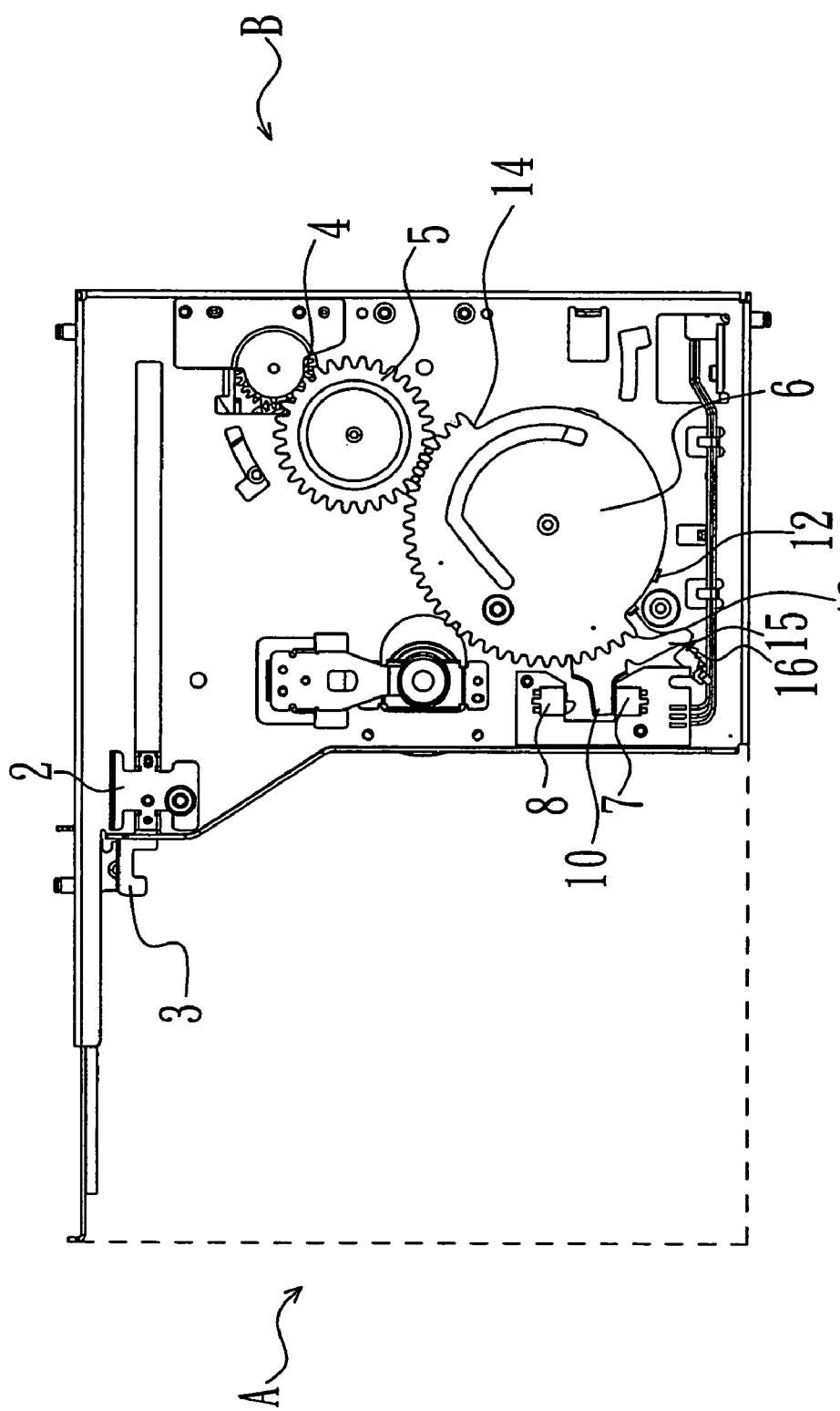
FIG. 3 is a perspective view showing the relationship between the sensor mechanism of an optical disc device for detecting tray in/out motion of the present invention and the gear for driving the ejection arm.

FIG. 3 is a perspective view showing the relationship between the sensor mechanism of an optical disc device for detecting tray in/out motion of the present invention and the gear for driving the ejection arm. From FIG. 3, it clearly shows that if the optical disc device gives an instruction for moving the tray in/out, it provides a power to drive the rotation of the drive gear 4 which simultaneous drives the rotation of the middle gear 5 and the gear wheel 6 and then the ejection arm is driving.

In this embodiment, the gear wheel 6 is provided with an array of protrusion teeth along part of its perimeter thus the array of protrusion teeth has a first teeth end 13 and a second teeth end 14. When the gear wheel 6 is rotating, the ejection arm 1 is driving to execute the tray moving in/out action.

Figure 4:
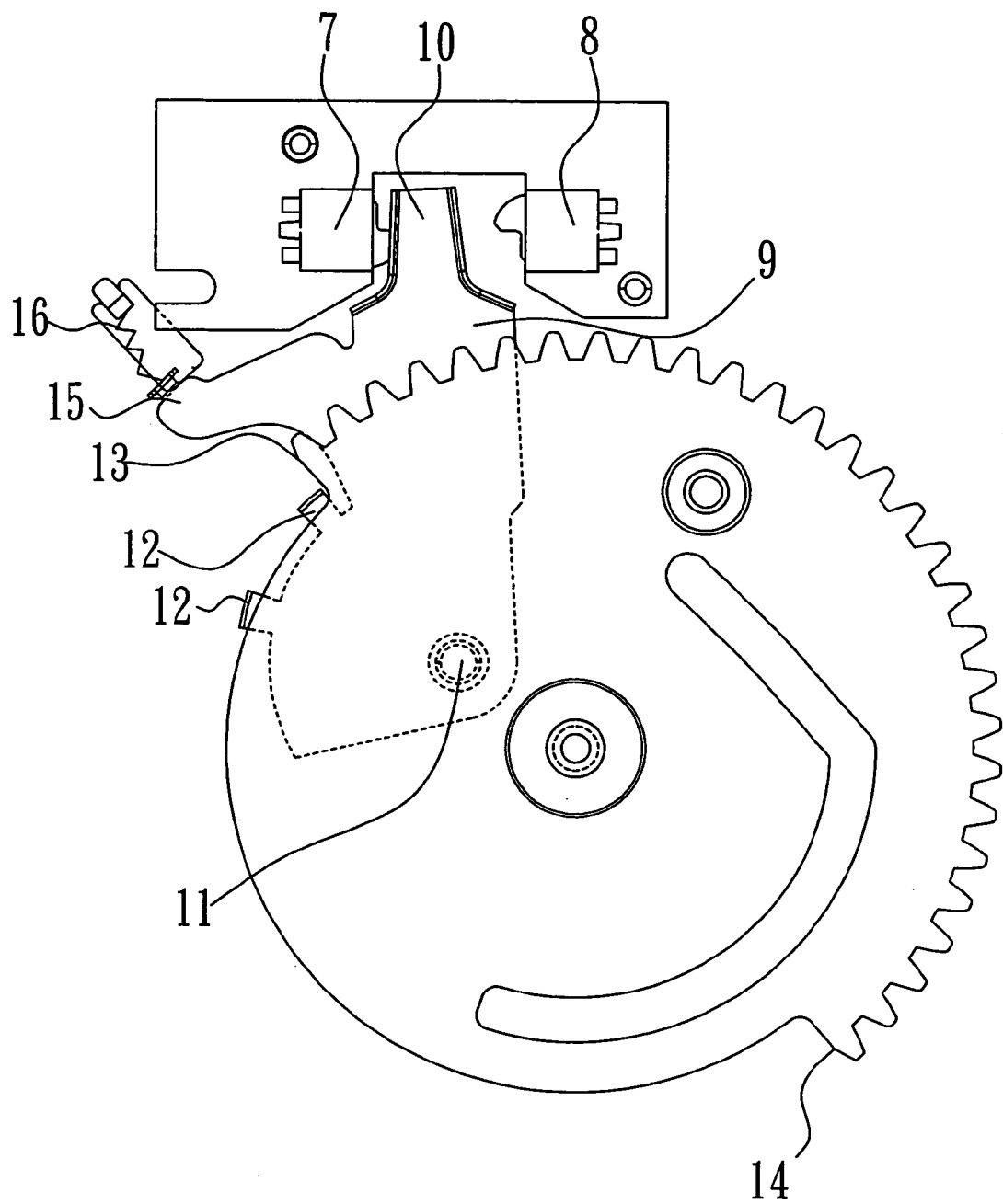
FIGS. 4 and 5 are perspective views showing the motion relationship between the sensor mechanism of an optical disc device for detecting tray in/out motion of the present invention and the gear for driving the ejection arm, respectively.
Figure 5:
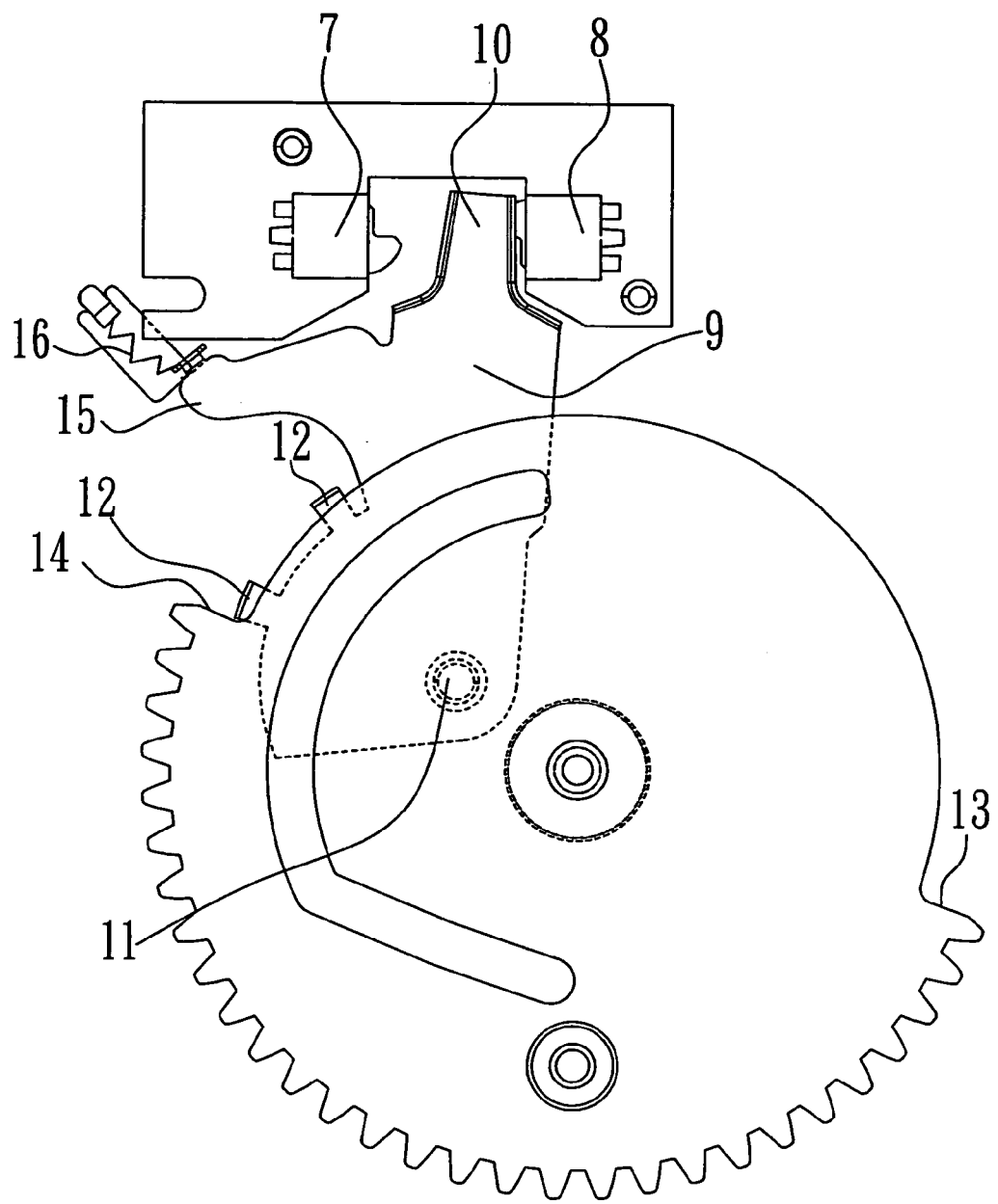

FIGS. 4 and 5 are perspective views showing the motion relationship between the sensor mechanism of an optical disc device for detecting tray in/out motion of the present invention and the gear for driving the ejection arm, respectively. In this embodiment, the sensor mechanism of an optical disc device for detecting tray in/out motion of the present invention comprises a swing bar 9 having an actuating bar 10, a spinning center 11 and a protrusion portion 12; and sensors 7 and 8. During the rotation of the gear wheel 6 for driving the ejection arm 1, the gear wheel 6 would push the protrusion portion 12 to allow the swing bar 9 rotating against the spinning center 11. When the gear wheel 6 is rotating to drive the ejection arm 1 to pull the tray in/out to the position for disc playing/reading or push the tray back to the magazine, the actuating bar 10 would touch and actuate the sensor 7 or 8. As shown in FIGS. 1 and 4, when the ejection arm 1 is driving to push the tray from the position for disc playing/reading into the magazine, the first teeth end 13 provided on the gear wheel 6 touches and pushes the protrusion portion 12 to allow the swing bar 9 rotating counterclockwise against the spinning center 11. Thus the actuating bar 10 in turn touches the sensor 7 provided in the optical disc device. The sensor 7 emits a signal that the tray has been moved out from the position for disc playing/reading and already held in the magazine so that the optical disc device gives an instruction to execute the next function, for example, allow the ejection arm moving upwards/downwards to select the next tray to play/read the disc on the tray or allow the ejection arm being a standby state.

Also, as shown in FIG. 5, when the ejection arm 1 is driving to pull the tray from magazine to a position for disc playing/reading, the second teeth end 14 provided on the gear wheel 6 touches and pushes the protrusion portion 12 to allow the swing bar 9 rotating clockwise against the spinning center 11. Thus the actuating bar 10 in turn touches the sensor 8 provided in the optical disc device. The sensor 8 emits a signal that the disc has been moved from the magazine to the position ready for disc playing/reading so that the optical disc device gives an instruction to execute the next function, for example, allow the disc clamper to clamp the disc and allow the optical pick up unit to play/read the disc.

Moreover, during the tray moving in/out, the protrusion portion 12 is pushed by the first teeth end 13 and the second teeth end 14, respectively while the gear wheel 6 rotates clockwise/counterclockwise. Thus the actuating bar 10 moves between the sensor 8 and sensor 7.

The swing bar 9 is further provided with an extrusion part 15, which is connected with a spring 16 fixed in the optical disc device, thereby the spring 16 provides a rebounding force to draw the swing bar 9 back to the original position, i.e. a position that the actuating bar 10 does not touch the sensor, if the protrusion portion 12 provided on the swing bar 9 is not pushed by the ends 13, 14. Therefore the actuating bar 10 is protected from touching the sensor if the gear wheel 6 is no action on the swing bar 9.

Figure 6:
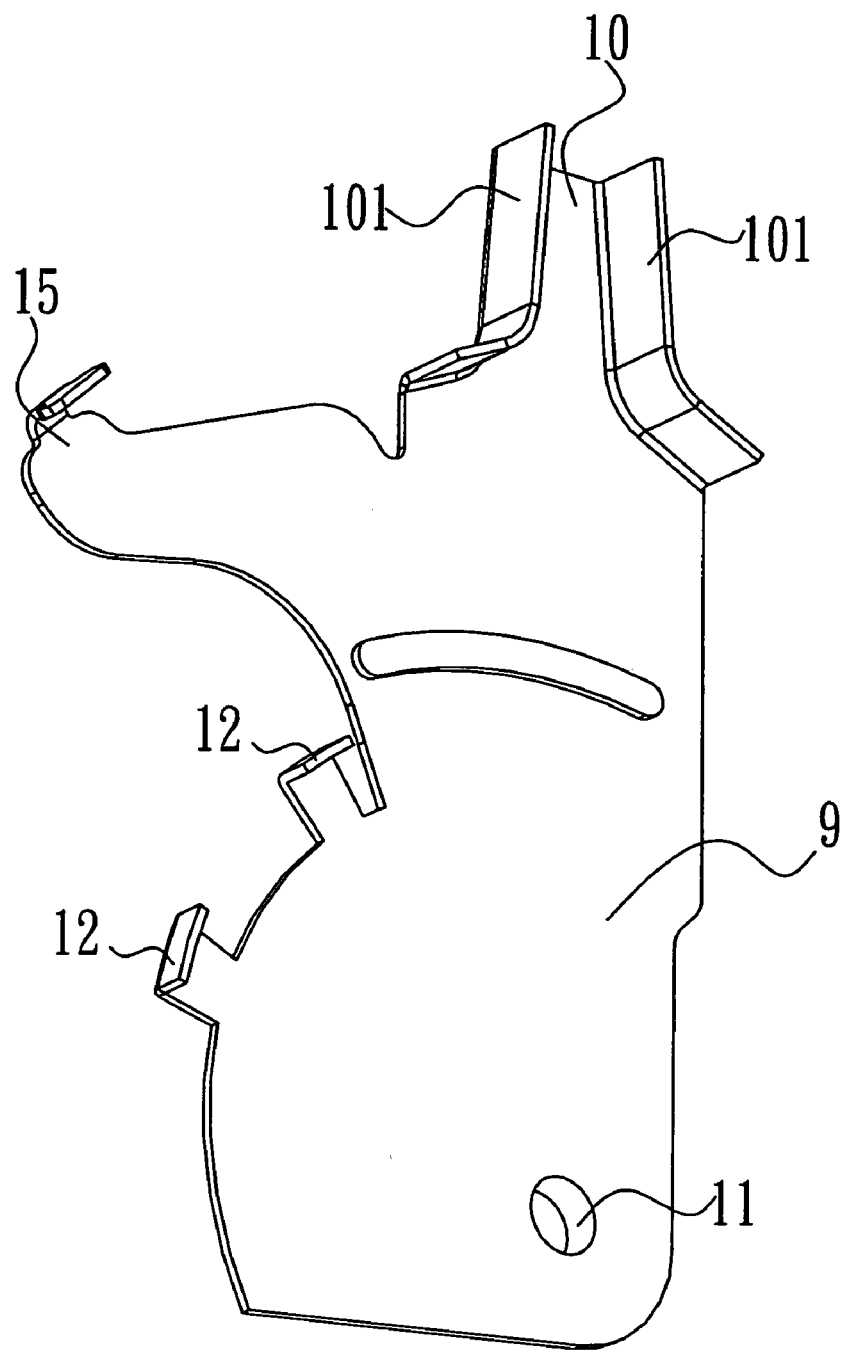
FIG. 6 is a perspective view showing one embodiment of swing bar structure in the sensor mechanism of an optical disc device for detecting tray in/out motion of the present invention.

FIG. 6 is a perspective view showing one embodiment of swing bar structure in the sensor mechanism of an optical disc device for detecting tray in/out motion of the present invention. From FIG. 6, it shows that the swing bar 9 is provided with two protrusion portions 12 which are protruded vertically so that they can be pushed by the first and second teeth ends 13, 14. Also, the actuating bar 10 is provided with a vertical plate 101 to press and touch the sensors 7, 8 to emit a signal that the tray has been moved in/out and allow the ejection arm 1 stopping.

Figure 7:
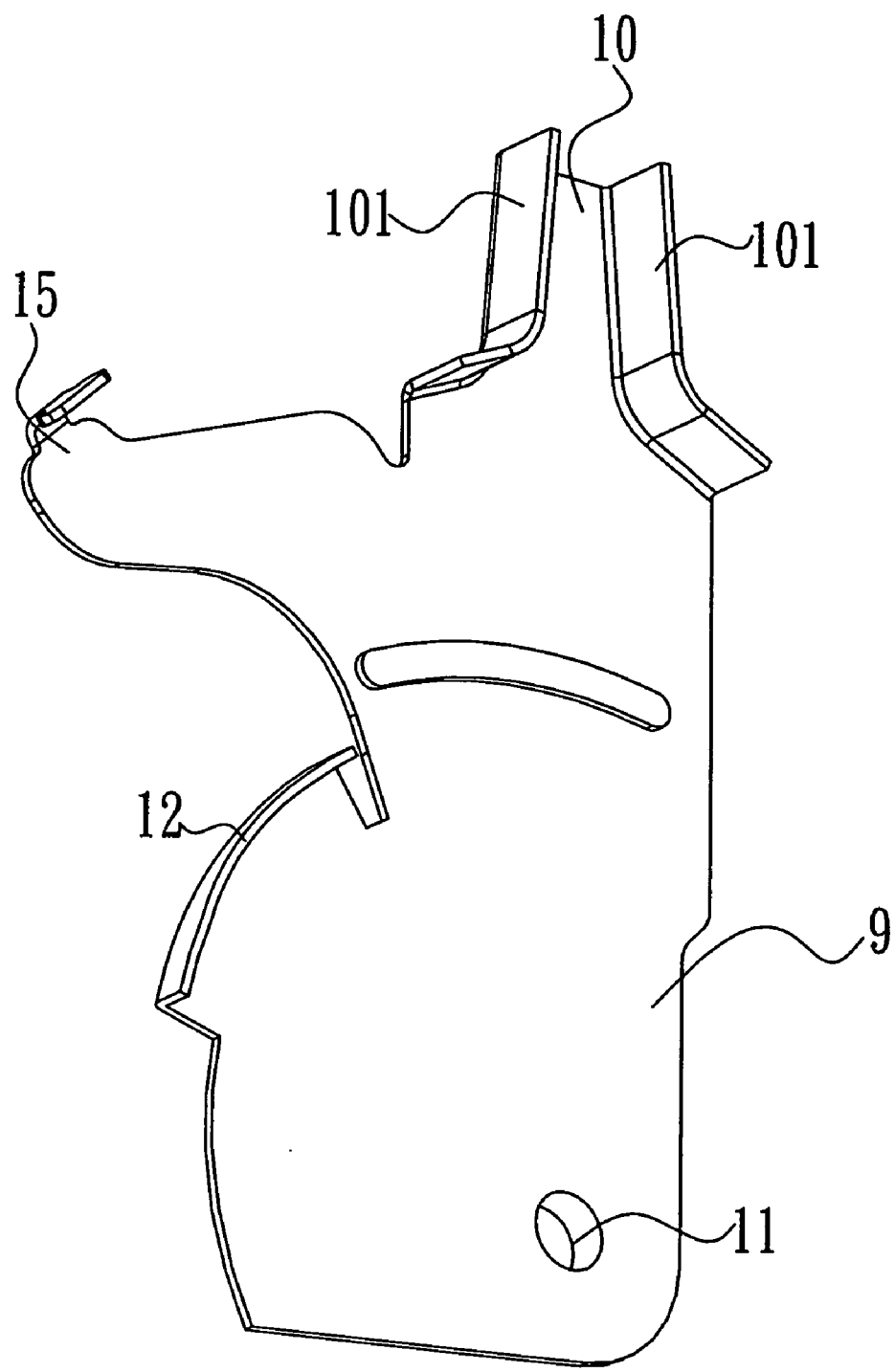
FIG. 7 is a perspective view showing another embodiment of swing bar structure in the sensor mechanism of an optical disc device for detecting tray in/out motion of the present invention

FIG. 7 is a perspective view showing another embodiment of swing bar structure in the sensor mechanism of an optical disc device for detecting tray in/out motion of the present invention. From FIG. 7, it shows that the swing bar 9 is provided with one protrusion portion 12 which is protruded vertically so that they can be pushed by the first and second teeth ends 13, 14. Also, the actuating bar 10 is provided with a vertical plate 101 to press and touch the sensors 7, 8 to emit a signal that the disc has been moved in/out and allow the ejection arm 1 stopping.

According to the sensor mechanism of an optical disc device for detecting tray in/out motion of the embodiment of the present invention, the swing bar 9 is positioned below the gear wheel 6. As the height of the pivot (not shown in the Figures) of the gear wheel 6 is slight higher than that of the spinning center 11, the swing bar 9 does not touch the gear wheel 6 in vertical direction in addition to the protrusion portion 12.

According to the sensor mechanism of the present invention, by using a simplified swing bar structure driving by a mechanism for executing tray motion in/out and cooperating with the switch, it has advantages of easily assembling, assembling time saving, and cost reducing.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A sensor mechanism of an optical disc device for detecting tray in/out motion, comprising:
    a swing bar having an actuating bar, a spinning center and a protrusion portion;
    a gear for driving the protrusion portion to rotate the swing bar against the spinning center during its rotation;
    at least one sensor for emitting a signal when it is actuated by the actuating bar; and
    an elastic element providing a rebounding force to draw the swing bar back to an original position as the gear releases the protrusion portion of the swing bar.

2. The sensor mechanism of an optical disc device for detecting tray in/out motion according to claim 1, wherein the signal indicates a state that the tray has been already moved in/out.

3. The sensor mechanism of an optical disc device for detecting tray in/out motion according to claim 1, wherein the swing bar is positioned vertically below the gear.

4. The sensor mechanism of an optical disc device for detecting tray in/out motion according to claim 1, wherein the gear is provided with at least one teeth end and the protrusion portion on the swing bar is pushed and moved by the teeth end.

5. The sensor mechanism of an optical disc device for detecting tray in/out motion according to claim 1, wherein the elastic element is a spring and the swing bar is further provided with an extrusion part which is connected with the spring.

6. A sensor mechanism of an optical disc device for detecting tray in/out motion, comprising:
    a swing bar having an actuating bar, a spinning center and a protrusion portion;
    a driving element for driving the protrusion portion to rotate the swing bar against the spinning center during its action;
    at least one sensor for emitting a signal when it is actuated by the actuating bar; and
    an elastic element providing a rebounding force to draw the swing bar back to an original position as the driving element releases the protrusion portion of the swing bar.

7. The sensor mechanism of an optical disc device for detecting tray in/out motion according to claim 6, wherein the signal indicates a state that the tray has been already moved in/out.

8. The sensor mechanism of an optical disc device for detecting tray in/out motion according to claim 6, wherein the swing bar is positioned vertically below the driving element.

9. The sensor mechanism of an optical disc device for detecting tray in/out motion according to claim 6, wherein the elastic element is a spring and the swing bar is further connected with the spring.

10. The sensor mechanism of an optical disc device for detecting tray in/out motion according to claim 6, wherein the driving element is a gear.

11. The sensor mechanism of an optical disc device for detecting tray in/out motion according to claim 10, wherein the gear is provided with at least one teeth end and the protrusion portion on the swing bar is pushed and moved by the teeth end.

12. An optical disc device having a main mechanism for executing tray motion in/out and disc playing/reading and a magazine for holding plural trays, comprising:
    a swing bar having an actuating bar, a spinning center and a protrusion portion;
    a driving element for driving the protrusion portion to rotate the swing bar against the spinning center during its action;
    at least one sensor for emitting a signal when it is actuated by the actuating bar; and
    an elastic element providing a rebounding force to draw the swing bar back to an original position as the driving element releases the protrusion portion of the swing bar.

13. The optical disc device according to claim 12, wherein the signal indicates a state that the tray has been already moved in/out.

14. The optical disc device according to claim 12, wherein the swing bar is positioned vertically below the driving element.

15. The optical disc device according to claim 12, wherein the driving element is a gear.

16. The optical disc device according to claim 15, wherein the gear is provided with at least one teeth end and the protrusion portion on the swing bar is pushed and moved by the teeth end.

* * * * *